Sept. 15, 1953 N. L. DAVIS 2,652,175
PLUG VALVE FOR CONTROLLING THE
FLOW OF SOLIDS LADEN LIQUID
Filed Feb. 1, 1949 3 Sheets-Sheet 2
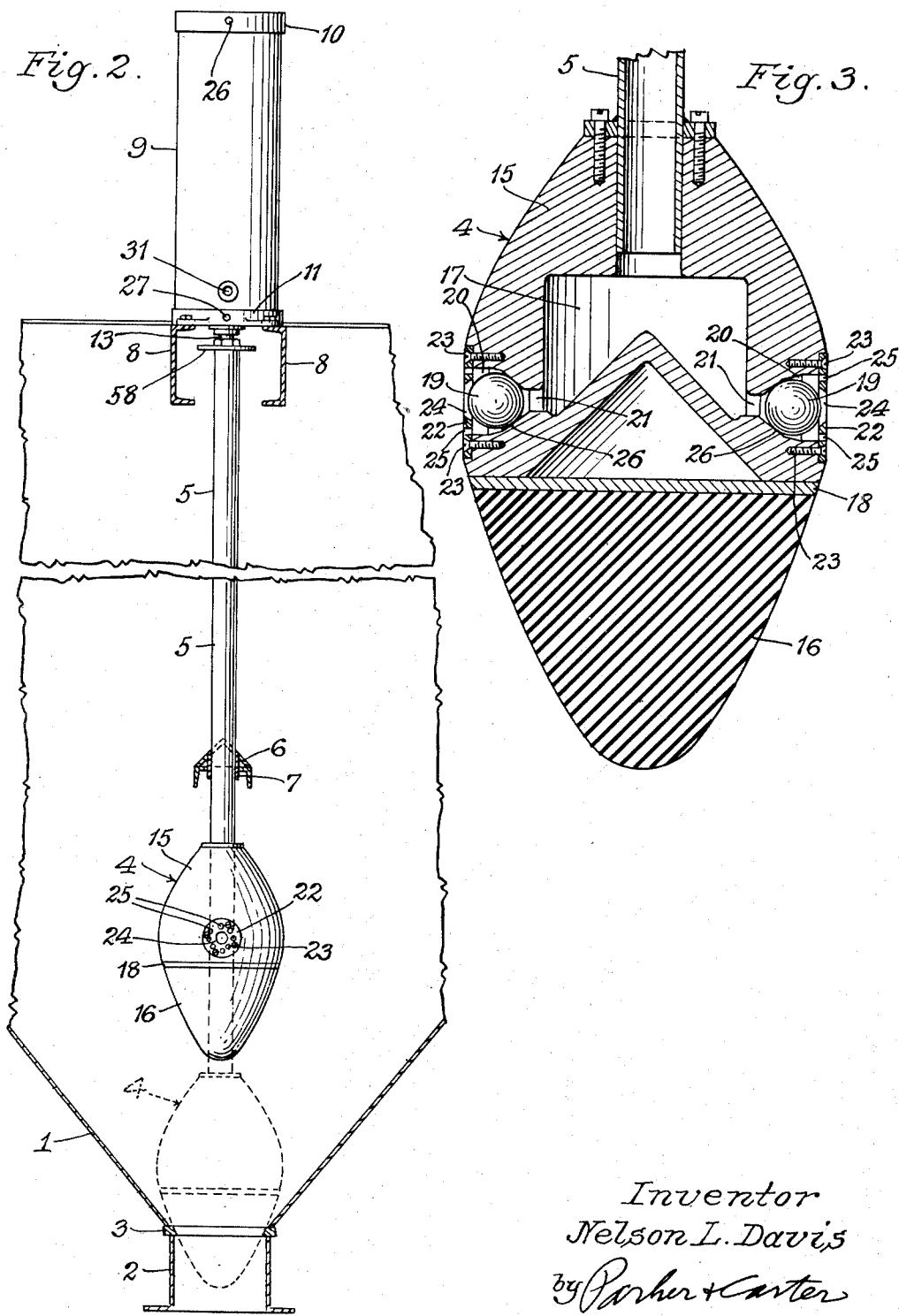
Inventor
Nelson L. Davis
by Parker + Carter
Attorneys.

Sept. 15, 1953
N. L. DAVIS
2,652,175
PLUG VALVE FOR CONTROLLING THE
FLOW OF SOLIDS LADEN LIQUID
Filed Feb. 1, 1949
3 Sheets-Sheet 3
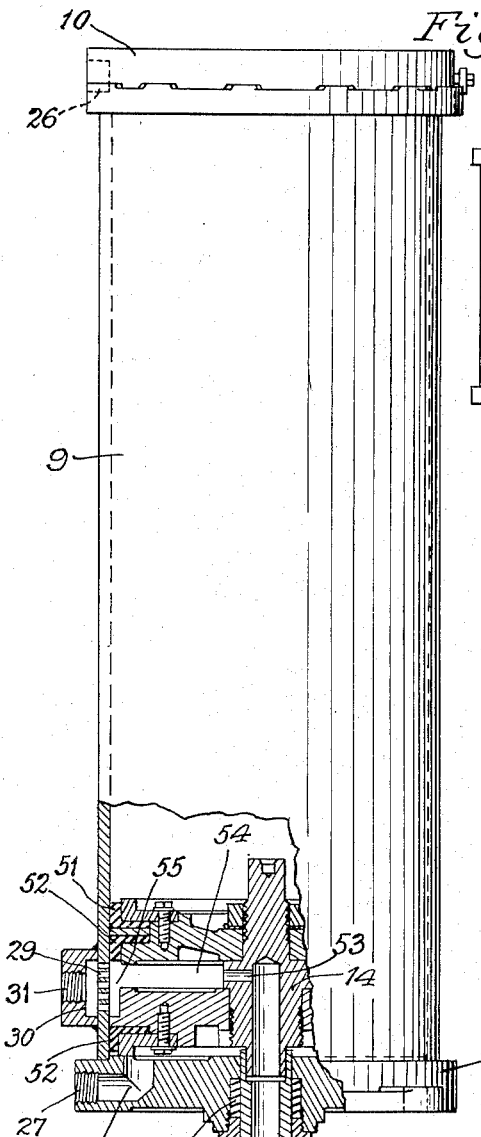
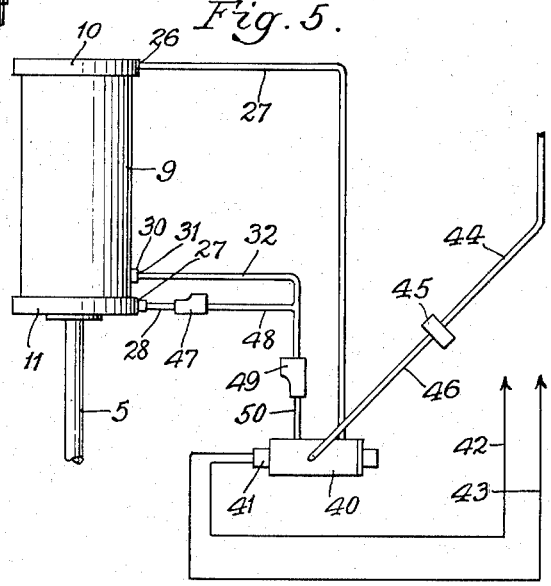
Inventor
Nelson L. Davis
by Parker & Carter
Attorneys.

Patented Sept. 15, 1953

2,652,175

UNITED STATES PATENT OFFICE 2,652,175

PLUG VALVE FOR CONTROLLING THE FLOW OF SOLIDS LADEN LIQUID

Nelson L. Davis, Chicago, Ill.

Application February 1, 1949, Serial No. 74,026

13 Claims. (Cl. 222—195)

My invention relates to improvements in plug valves. It has for one object to provide a plug valve especially useful in connection with ore dressing and coal treating where it is necessary to provide a valve to control the flow of solids laden liquid, the solids in which are likely to settle when the valve is closed and interfere with subsequent opening of the valve.

My invention therefore relates to a plug valve, actuating means therefor and automatic means associated therewith to free the valve from interference by foreign matter located above the valve.

I have illustrated my invention as applied to a plug valve which closes a vessel having a bottom outlet for a fluid to be discharged from the vessel and to be passed through a connecting pipe.

The vessel is the reservoir which in the particular instance illustrated, is of such size as to hold the entire mass of water which with magnitite in suspension furnishes a heavy medium for treatment of coal in a float and sink separating apparatus.

The apparatus is such that if operation stops, either at the will of the operator or because of power failure, all the heavy media will be concentrated in the receiving vessel. Since finely divided magnitite in water has a slow sink rate, it circulates as a heavy liquid, but when operation ceases with the plug valve closing the discharge aperture, the magnitite will settle over the plug into a relatively hard mass which would effectively interfere with the unseating of the plug when it is desired to resume operation.

I therefore provide pneumatic means of seating and unseating the plug, and associated therewith, pneumatic means for aerating or agitating the liquid around the plug to free it so that the plug may be withdrawn when operation is to start.

My invention is illustrated more or less diagrammatically in the accompanying drawings, wherein:

Figure 2 is a section along the line 2—2 of Figure 1;

Figure 3 is an enlarged section of the plug valve itself;

Figure 4 is a section through the air cylinder; and

Figure 5 is a diagrammatic air electrical circuit for operating the valve.

Like parts are indicated by like characters throughout the specification and drawings.

Figure 1:
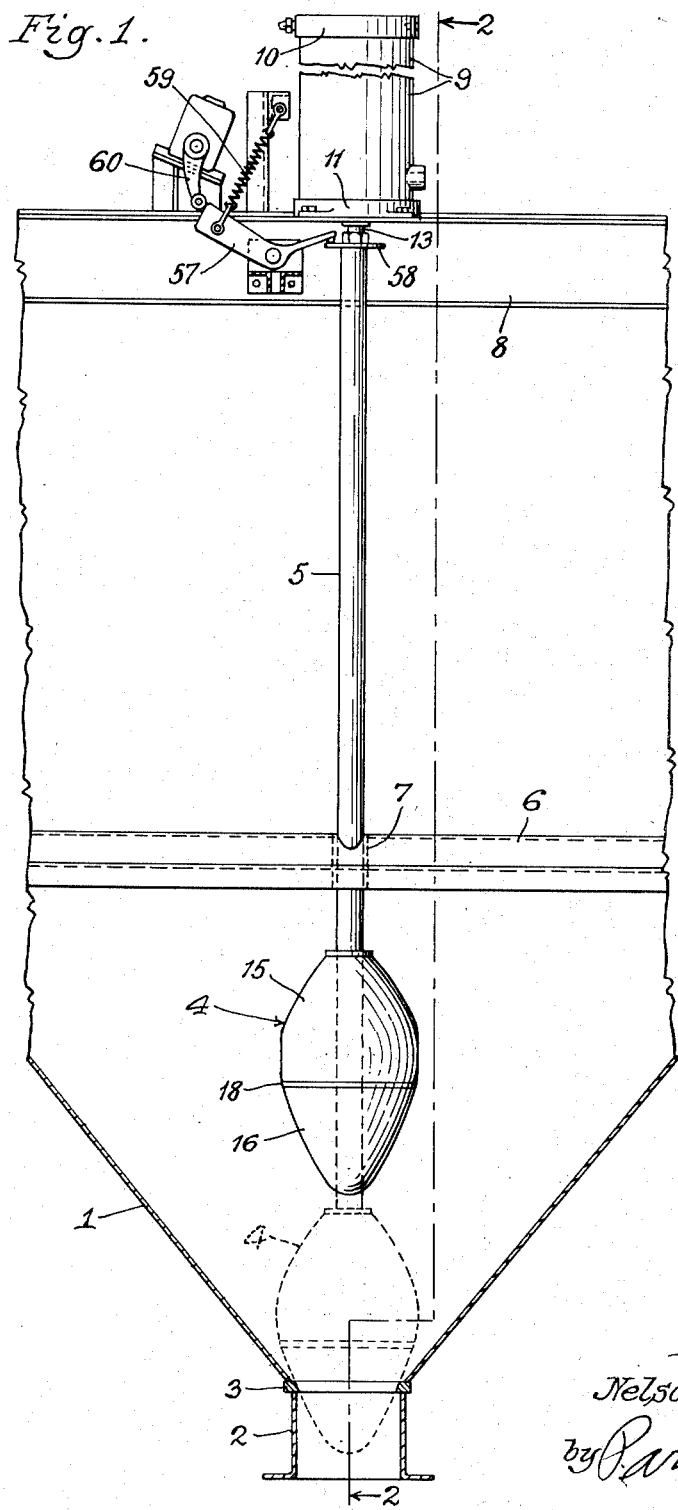
Figure 1 is an elevation in part section of a plug valve, the air cylinder and a portion of the vessel.

1 is the bottom of a storage vessel. It is conical, as indicated, but may be pyramidal, and terminates in a reinforced cylindrical discharge pipe 2 which may lead to a pump or any other suitable part of the apparatus. 3 is a valve seat at the upper end of the pipe 2 where it joins the conical bottom 1. 4 is a plug valve. It is carried by a hollow stem 5. 6 is a cross member extending across the vessel and having a guide 7 for the valve stem 5. 8, 8 indicates a pair of channel members extending across the top of the vessel. They carry the air cylinder 9. The air cylinder 9 is closed at one end by a cylinder head 10, at the other end by a cylinder head 11. The cylinder head 11 contains a packing gland 12 in which reciprocates a hollow piston rod 13 attached to the end of the valve stem 5. 14 is a piston on the piston rod 13 adapted to reciprocate in the cylinder 9.

The plug valve includes a metallic body 15 to which is attached the valve stem 5. 16 is a seat engaging portion of rubber or similar flexible material attached to the underside of the valve body 15 and adapted to seat on the valve seat 3. This seat engaging portion is renewable. The valve body 15 contains a central hollow aperture 17 communicating directly with the interior of the hollow valve stem 5. 18 is a plate integral with the member 16 and adapted to be attached to the body 15 by bolts and nuts or any other suitable mechanism.

19 indicates a rubber ball valve. Actually, rubber hand balls have been found entirely satisfactory. This ball valve seats in a socket 20 joined by a passage 21 to the chamber 17 in the interior of the valve 4. The ball is held in place by an apertured plate 22 which in turn is held in the valve seat by screws 23. The plate 22 has a central aperture 24 and a plurality of peripheral apertures 25. The ball 19 in the position shown in Figure 3 is seated against the valve seat 26 in the base of the socket 20 so entrance of liquid from the vessel into the interior of the valve 15 is prevented. If air pressure is applied through the stem 5 into the chamber 17, it will unseat the ball 19, and as the ball 19 moves out, it will finally seat against the plate 22 to close the aperture 24, the apertures 25 remaining open. Under these circumstances, the air passes out around the ball 19 through the apertures 25 into the liquid surrounding the plug valve. The air pressure is of course higher than the liquid pressure and so the balls 19 will be held in place against the apertures 24. The apertures 25 permit free movement of liquid from the space in the chambers 20 on the outer sides of the balls.

The cylinder head 10 is tapped at 26 for an air pipe 27 to provide entrance and exit of air to the cylinder above the piston 14, as will hereinafter appear. The cylinder head 11 is tapped at 27 for connection with an air pipe 28 below the piston 14. The side wall of the cylinder just above the lower end is apertured as at 29, the apertures being covered by a shroud 30, tapped at 31 for connection with a pipe 32.

40 is a four-way solenoid valve one-way spring return. It contains a solenoid, diagrammatically illustrated at 41, to actuate the valve. The solenoid is controlled by a control circuit 42, 43. Air from any suitable source of supply comes through the pipe 44 through the reducing valve air filter and gauge unit 45 and pipe 46 to the four-way valve 40. The pipe 27 leads from the four-way valve to the cylinder 9 at tap 26. Pipe 28 leads from cylinder 9 at tap 27 to air speed control valve 47, pipe 48, extends therefrom to air speed control valve 49, and pipe 50 extends to the four-way solenoid valve 40. Pipe 32 joins pipe 48 to cylinder at 31.

The piston 14 has a plurality of packing rings 51, 52. The packing ring 51 packs against downward air pressure on the top of the piston, the packing ring 52 against pressure below the piston. 53 indicates an air passage from the hollow piston rod 13 to a chamber 54 between the upper and lower piston spools. This chamber 54 communicates with an extended chamber 55 which in the down position of the piston communicates with the apertures 29 in the cylinder wall. The passage 56 extends through the cylinder head 11 to the connection 27.

Although I have shown an operative form of my invention, it will be recognized that many changes in the form, shape and arrangement of parts can be made without departing from the spirit of the invention, and my showing is therefore to be taken as, in a sense, diagrammatic.

The use and operation of my invention are as follows:

Starting with the parts in the position shown in full lines in Figure 4 and dotted lines in Figures 1 and 2, the plug valve is seated, the heavy medium is entrapped in the receptacle and the solids will have settled above the plug valve 15. The solenoid of the four-way valve 40 is energized by circuit 42, 43. This opens the valve, allows air to pass from the supply through the pipe 44, filter 45, pipe 46, and solenoid valve 40 to the cylinder head 11 at 27 and cylinder wall 9 at 31. Valve 47 provides no obstruction to air flow in the direction indicated by the arrow but it is adjustable to control the flow of air in the opposite or valve opening direction. This permits a time delay in the raising of the piston 14 to permit the solids settled in the vessel immediately above the plug valve to be restored to liquid suspension. The air pressure is sufficient to cause flow of air through 31, piston chambers 55, 54, passage 53 into the hollow valve stem 13, thence down into the chamber 17 to unseat the balls 19 and bubble out through the plug valve 15 to free the valve by agitating the heavy medium sufficiently to lift the settled solids away from the plug. As the settled solids which have been packed in the bottom of the vessel 1 and which hold the plug valve 4 seated, are restored to liquid suspension, the lower pressure air entering at 27 is now sufficient to slowly move the piston 14 upwardly. Air admitted through 31 acts on the opposed surfaces on either side of the chamber 54 and the pressure acting on such balanced areas is not effective to move the piston either up or down.

The importance of the delayed action is that while it is always possible to provide a mechanism powerful enough to pull the plug valve off the seat no matter how dense the settled solids are at the bottom of the vessel, if this were done, then when the plug valve was opened, a slug of settled solids might be forced into the discharge pipe and so get into the system to interfere with the operation of the device. It will be understood, of course, that when the device operates, the settled solids must be evenly distributed in suspension throughout the system, as otherwise conduits will clog, pump operation will be interfered with and the suspension medium involved would not be properly distributed for the use for which it is intended. But when the settled solids are first agitated and thrown back into suspension before the valve opens, then all that passes out into the circulatory system is a medium containing properly diffused liquid and solids. As soon as the piston moves past 29, air no longer passes through the plug valve and the full force of air pressure becomes available to move the piston rapidly to the top of the air cylinder, thus raising the plug valve into the position shown in Figures 1 and 2.

As the piston reaches the top of its stroke, a limit switch automatically starts the pump which is connected by piping with the bottom of the vessel, neither of which are illustrated as they form no part of the invention, and then circulation through the valve seat 3 commences and continues.

The limit switch takes the form of a bell crank lever 57 having one arm adapted to be engaged by a member 58 on the piston rod 13. A spring 59 tends to rotate the bell crank lever in a clockwise direction. When the member 58 overcomes the spring, the lever engages a switch lever 60 to start the pump.

When the operator wishes to shut down or if there is a failure of current which compels a shut down, the solenoid of the four-way valve is de-energized by closing circuit 42, 43. The spring return of the valve permits air to pass through the pipe 27 to 26, moving the piston down, the air now entering to the top of the piston. However, the speed control valve 49 limits the downward movement of air from below the piston so as to regulate the speed of piston descent and so the speed of the plug valve as it approaches and finally seats on the valve seat. At that time air movement ceases and as long as the solenoid remains de-energized, the valve remains closed.

I claim:

1. In combination, a plug valve, an aperture adapted to be closed by the valve, a valve seat surrounding the aperture adapted to be engaged by the valve, a chamber within the valve entirely above the seat, means for supplying air under pressure to said chamber, the chamber being ported to permit discharge of such air from the chamber to the area surrounding the valve, the chamber ports being located entirely above the valve seat when the valve is in the closed position.

2. In combination, a plug valve, an aperture adapted to be closed by the valve, a valve seat surrounding the aperture adapted to be engaged by the valve, a chamber within the valve entirely above the seat, means for supplying air under pressure to said chamber, the chamber being ported to permit discharge of such air from the chamber to the area surrounding the valve, the chamber ports being located entirely above the valve seat when the valve is in the closed position, check valve means associated with said ports whereby the entrance of fluid into the valve through said ports is prevented while discharge of fluid from the valve through said ports is permitted.

3. In combination, a plug valve, a seat therefor, an air chamber in the valve, there being a discharge passage from the chamber to the outside of the valve above the seat, a ball check valve adapted to close such passage against fluid movement inwardly, an apertured plate overlying the check valve, the plate having one large aperture adapted to be closed by the valve when in the discharge position and a plurality of smaller apertures surrounding it, open for free flow of liquid toward and from the check valve.

4. In combination with a reservoir having a bottom discharge aperture, a valve seat encircling the aperture, a plug valve within the reservoir mounted for movement toward and from the seat, a hollow valve stem carrying the valve, a cylinder having a piston connected to the valve stem, means for supplying fluid to the cylinder to move the piston selectively up and down, means for controlling the supply of such fluid to cause fluid to pass downwardly through the valve stem into the plug valve when the valve is closed and is about to open, the plug valve being apertured for the discharge of fluid therefrom into the area above the seat, means for causing the fluid to raise the piston to open the valve and thereafter to discontinue the supply of fluid to the valve while continuing the supply of fluid to the piston to continue its upward movement.

5. In combination, a cylinder, a piston mounted for reciprocation therein, the piston having a hollow stem, a port in the cylinder wall, a chamber within the piston in register with the port when the piston is at the end of its lower excursion, the chamber being in communication with the hollow piston rod, means for supplying fluid to the cylinder beneath the piston, and means for supplying fluid to the chamber within the piston simultaneously.

6. In combination, a cylinder, a piston mounted for reciprocation therein, the piston having a hollow stem, a port in the cylinder wall, a chamber within the piston in register with the port when the piston is at the end of its lower excursion, the chamber being in communication with the hollow piston rod, means for supplying fluid to the cylinder beneath the piston, and means for supplying fluid to the chamber within the piston simultaneously, the cylinder wall being adapted to close the chamber in the piston after a predetermined upward excursion of the piston.

7. In combination, a valve seat, a plug valve adapted to close it, means for moving the valve toward and from the seat to open and close the seat, a hollow stem for the plug valve, a piston connected to said stem, a cylinder in which the piston may reciprocate, there being a chamber in the piston in communication with the hollow stem and open through the outer periphery of the piston, means for supplying fluid to the cylinder to reciprocate it and means for supplying fluid to the valve stem including a port in the cylinder wall adapted to register with the chamber when the piston is at one end of its excursion, the valve being ported in communication with the hollow stem whereby when fluid is supplied under pressure thereto, fluid passes out of the valve immediately above its seat, the cylinder wall being adapted to interrupt the supply of fluid to the valve stem as the piston moves upwardly.

8. In combination, a liquid tight vessel, having a discharge port adjacent the bottom thereof, a valve adapted to open and close the port, pneumatic means for actuating the valve, and for discharging air under pressure into the vessel, adjacent the port and valve to agitate the liquid, control means effective, when the valve is seated, to first cause the agitating air to be supplied to the vessel, and to thereafter open the valve to permit the discharge of the agitated liquid from the vessel.

9. In combination, with a vessel open to the atmosphere at the top and adapted to contain a liquid, a discharge port at the bottom of the vessel, a valve body within the vessel movable toward and from the port to close and open it, an air conduit terminating adjacent and above the port and in communication with the interior of the vessel, means for supplying air under pressure above atmospheric to said conduit to agitate the liquid and restore to liquid suspension those settled solids which immediately surround the valve and port and means for thereafter opening the valve.

10. In combination, a liquid tight vessel having a discharge port adjacent the bottom thereof, a valve adapted to open and close the port, an air conduit terminating adjacent and above the port and in communication with the interior of the vessel, means for supplying air under pressure to said conduit to agitate the liquid and restore to the liquid suspension those settled solids which immediately surround the valve and port and means for thereafter opening the valve, the valve opening means including a piston, a cylinder and a driving connection between the piston and the valve, the air supply means including a conduit communicating with the interior of the cylinder.

11. In combination, a conical vessel adapted to receive a liquid with solids in suspension, a discharge port adjacent the apex of and in a plane perpendicular to the axis of the cone, a valve seat defining the port, a valve body above and movable toward and from the seat, the valve body terminating in a tapered, resilient, compressible member, the valve body being movable upwardly to unseat and downwardly to seat, adapted to penetrate the seat and make a liquid tight contact therewith there being an air passage extending through the valve body, means for forcing air under pressure into the vessel through said passage in the valve body immediately above the seat and adjacent the conical walls of the vessel.

12. In combination, a liquid tight vessel adapted to receive a liquid with solids in suspension, a discharge port, a valve seat defining the port, a valve body above and movable toward and from the seat, the valve body terminating in a tapered, resilient, compressible member, the valve body being movable upwardly to unseat and downwardly to seat, adapted to penetrate the seat and make a liquid tight fit there being an air passage extending through the valve body, means for forcing air under pressure into the vessel through said passage in the valve body immediately above the seat.

13. In combination, a vessel adapted to receive a liquid with solids in suspension, a discharge port in a horizontal plane adjacent the bottom of the vessel, a valve seat defining the port, a valve body above and movable toward and from the seat, the valve body terminating in a tapered resilient compressible member, the valve body being movable upwardly to unseat and downwardly to seat, being adapted to penetrate and extend through the seat and make a liquid tight contact therewith there being an air passage extending through the valve body, means for forcing air under pressure into the vessel through said passage in the valve body immediately above the seat and adjacent the bottom of the vessel.

NELSON L. DAVIS.

References Cited in the file of this patent

UNITED STATES PATENTS

| Number | Name | Date |
|---|---|---|
| 588,600 | Pelton | Aug. 24, 1897 |
| 691,975 | Schaaf | Jan. 28, 1902 |
| 1,029,273 | Butler | June 11, 1912 |
| 1,556,848 | Kruger | Oct. 13, 1925 |
| 1,872,548 | Zur Lowen | Aug. 16, 1932 |
| 1,873,119 | Griswold | Aug. 23, 1932 |
| 2,011,133 | Yoss | Aug. 13, 1935 |
| 2,211,068 | McDonald | Aug. 13, 1940 |
| 2,241,294 | Carreras | May 6, 1941 |
| 2,254,472 | Dahl | Sept. 2, 1941 |
| 2,305,724 | Luetzelschwab | Dec. 22, 1942 |
| 2,315,031 | Wiegand | Mar. 30, 1943 |
| 2,551,842 | Kirchner | May 8, 1951 |